Figure 1:
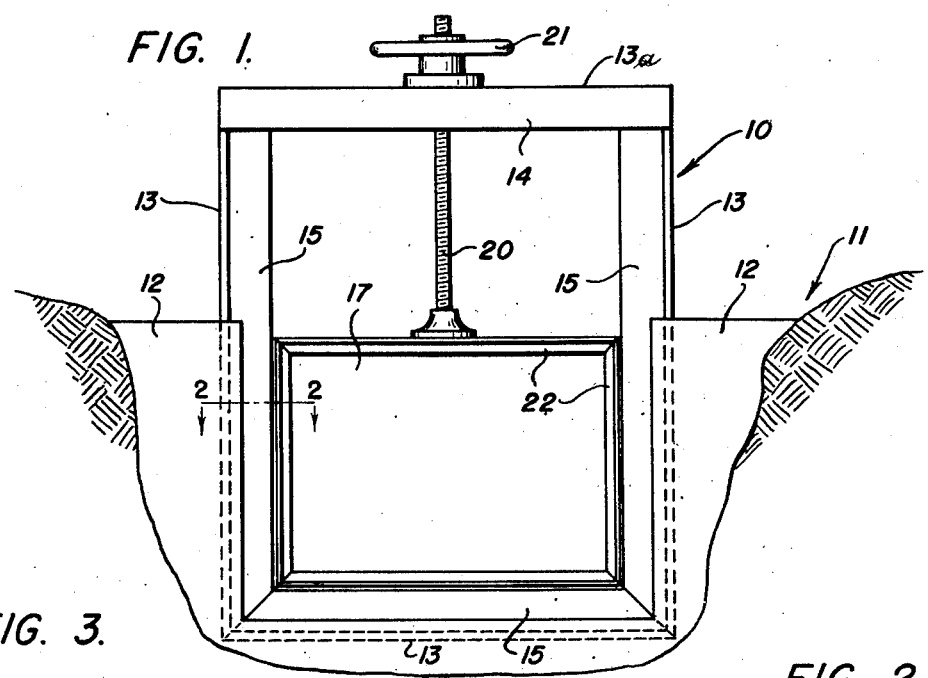

May 5, 1953 — A. T. BLACK — 2,637,171
WATER GATE
Filed March 28, 1949

Inventor:
AVERNO T. BLACK,
By [signatures]
Attorneys

Patented May 5, 1953

2,637,171

UNITED STATES PATENT OFFICE 2,637,171

WATER GATE

Averno T. Black, Deseret, Utah

Application March 28, 1949, Serial No. 83,817

8 Claims. (Cl. 61—28)

This invention relates to water gates as used extensively in connection with irrigation canals and ditches.

In regions where irrigation of agricultural crops is essential because of semi-arid climatic conditions, water is customarily parceled out to the individual users from canals which serve as main arteries of supply. The flow passes from such canals into so-called irrigation ditches which traverse the fields of the individual water-user.

Since the supply of water is usually limited in quantity in any given area, considerable care is exercised to guard against waste by leakage. Furthermore, care must be exercised in the distribution of the water between individual users, so that such distribution will be equitable, and also between given parts of any one individual's property, so various crops will get appropriate quantities of water.

Water gates as heretofore constructed for use in the control of flow between canal and canal, canal and ditch, and between the various ditches on a given property have embodied a gate slidable within ordinary channel slideways, the fit between plate margins and slideways being as close as could reasonably be employed without producing binding against sliding action of the gate. In actual practice, this fit has not been sufficiently watertight to protect against leakage and consequent waste or improper distribution of the water.

In accordance with this invention, however, I provide a water gate construction which effectively seals against water leakage, without binding or otherwise hindering opening and closing of the gate.

Thus, a principal object of the invention is to provide a water gate construction whereby leakage is reduced to a minimum, if not prevented altogether, and gate operation is free from difficulty.

Other objects are to provide such a construction which is relatively simple, which may be economically fabricated and easily installed; which will give long, trouble-free service, and which is capable of fabrication in a variety of sizes to fit a variety of needs.

An outstanding feature of the invention is the provision of resilient slideways which hug marginal surfaces of the gate at all times, thereby not only insuring tightness against leakage at all times, but eliminating any looseness of fit between gate and slideways, which, in conventional constructions, tend to produce binding and sticking of the gate.

Further objects and features of the invention will become apparent from the following detailed description of the presently preferred specific forms illustrated in the accompanying drawing by way of example and not of limitation.

Figure 3:
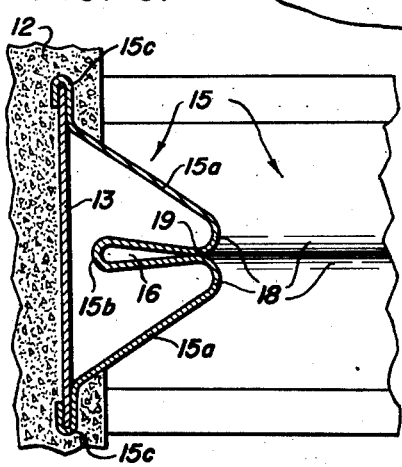
Figure 2:
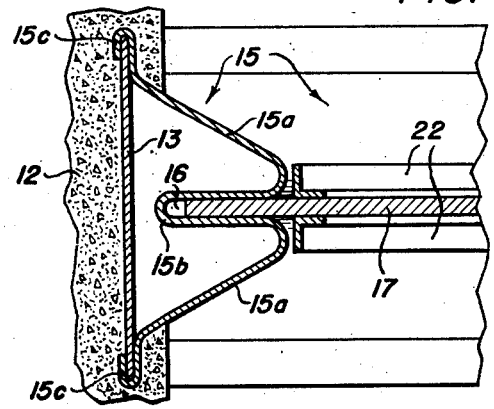
Figure 4:
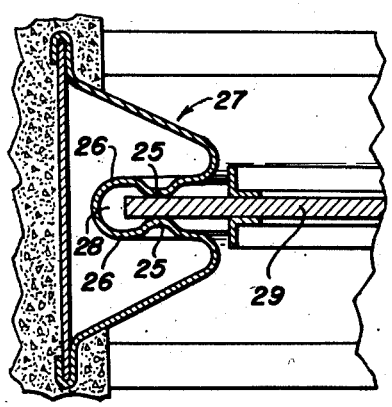

In the drawing:

Fig. 1 represents either a front or a rear elevation of one form of water gate, pursuant to the invention, as installed across an irrigation ditch;

Fig. 2, a fragmentary horizontal section taken on the line 2—2 of Fig. 1 and drawn to an enlarged scale;

Fig. 3, a view similar to that of Fig. 2, but illustrating the position of the slideway-defining members prior to installation of the gate; and Fig. 4, a view corresponding to that of Fig. 2, but illustrating a somewhat different form of the invention.

Referring now to the drawing: as illustrated in Figs. 1, 2, and 3, a slideway frame 10 is permanently installed across an irrigation ditch 11, as by means of embedding in a concrete receiving wall 12.

The slideway frame is preferably rectangular and comprises peripheral base members which are here shown as flat strips 13, of uniform width. Such strips may be of sheet metal, structural steel, wood, or other suitably rigid material. They are joined at the frame corners in any suitable fashion. For example, when sheet metal is employed, a long strip of same may be bent into rectangular form and the two ends joined in any one of the ways customary in the sheet metal art. In such instance, the top member 13a will be provided with depending, reinforcing flanges 14, which add the structural strength necessary to support the weight of a gate and gate-controlling mechanism, as hereinafter described. Where structural steel is utilized, a length of same may be bent in similar manner to provide the two sides and the bottom, the top cross-piece being an inverted channel welded in place.

Attached to respective base members, and extending inwardly of the frame, are gate-receiving members which are of resilient formation defining sealing slideways for a gate.

In the illustrated embodiment, elongate, gate-receiving members 15 are resiliently formed of stiffly flexible and water resistant sheet material, such as a structural sheet metal, bent to general W-configuration to provide wings 15a which diverge outwardly from a centrally disposed reentrant bend portion 15b. Such re-entrant bend portion 15b defines an elongate, slideway groove 16 which is sufficiently deep to provide an effective seal along received margins of the gate 17, see Fig. 2.

The respective gate-receiving members 15 are preferably bent to shape from a strip of sheet metal so as to be integral in formation. The required resiliency is imparted by the bends, especially those adjacent the re-entrant portion 15b, see 18, Fig. 3, such resiliency being enhanced in the illustrated construction by the wings 15a. It is advantageous that the resiliency be sufficiently powerful to force the defining walls of the groove into mutual contact when the gate 17 is not in place within the slideways, as is shown by Fig. 3.

In the embodiment of Figs. 2 and 3, a line of contact between opposing walls is made at the mouth of the groove 16, see 19, Fig. 3, providing pressure seals against opposite marginal surfaces of the gate 17 when installed, see Fig. 2.

The respective gate-receiving members 15 are advantageously attached to the base members 13 by means of feet 15c of clip formation formed by bending the terminal portions of wings 15a inwardly upon themselves. The respective feet 15c engage opposite edge margins of the base member 13, thereby stressing the gate-receiving member so that its resiliency becomes operatively effective. The base member and engaging feet are preferably anchored by embedding in the concrete receiving wall 12, as shown.

While this manner of attaching the gate-receiving members to the respective base members is preferred, attachment may be satisfactorily effected in a variety of other ways, for example, by the use of suitable fastening means such as rivets, as will be apparent to those skilled in the art.

Gate-receiving members are always provided at opposite lateral sides of the slideway frame as sealing guideways for the gate. As is customary, gate-controlling mechanism in the form of a threaded stem 20 received and movable by an internally threaded hand-wheel 21, anchored to the top cross-piece, is provided for raising and lowering the gate along such sealing guideways, it being noted that the resilient nature of the gate-receiving members not only accomplishes efficient sealing against leakage of water through closed portions of the water gate structure, but effectively eliminates any tendency toward binding, also. The sealing pressure, it will be found, does not hinder operation of the gate.

It is advantageous, though not alway necessary, that the bottom cross-piece of the slideway frame be also provided with a gate-receiving member, as illustrated, so that the seal will encompass all the avenues where water could leak through the water gate structure. In this case it is advisable that the meeting edges of the several gate-receiving members be soldered or otherwise rendered water-tight.

The gate 17 may be provided with superficial guide frames 22, if so desired.

In Fig. 4 is illustrated a somewhat different embodiment, wherein opposing elongate ribs 25 are formed longitudinally of the groove-defining walls 26 of the gate-receiving member 27, projecting inwardly of the slideway groove 28 and providing localized areas of contact against the gate 29. Such areas of contact provide lines of pressure seal which are equivalent to those established at the mouth of the slideway groove 16 of the previously described embodiment, but eliminate extensive face-to-face contact areas which add frictional resistance to the operation of the gate.

In all instances it may be said that the gate has a wall thickness at the marginal portions thereof received by the slideway grooves which is in excess of the normal width of such grooves, whereby the groove-defining walls hug the gate for sealing and guiding action.

Whereas this invention is here illustrated and described with respect to certain presently preferred specific forms thereof, it is to be understood that various changes may be made therein and various other forms may be constructed on the basis of the teachings herein, by those skilled in the art, without departing from the protective scope of the following claims.

I claim:

1. In water gate construction, laterally disposed and elongate slideways spaced apart in opposed relationship to define a flow passage therebetween and to receive a gate for controlling flow through said passage, each of said slideways being formed of stiffly flexible and water resistant structural sheet material bent to general W configuration wherein the bends are free for flexure and the central re-entrant bend has a constricted portion removed outwardly from the closed end thereof and facing the similarly constricted portion of the central re-entrant bend of the opposed slideway for slidably receiving the gate therein and making a sealing engagement therewith; and means anchoring the terminal portions of the wings of said W configuration in their mutually spaced relationship.

2. The combination recited in claim 1, wherein the terminal portions of the wings are bent inwardly upon themselves to provide respective feet of opposing clip formation, and the anchoring means are respective rigid strips received by and extending between the said feet.

3. The combination recited in claim 1, wherein the wings of the W configuration diverge in their extension from their respectively corresponding bends.

4. The combination recited in claim 1, wherein the constricted portion of the re-entrant bend is provided by those bends which define the mouth of said re-entrant bend.

5. The combination recited in claim 1, wherein the constricted portion of the re-entrant bend is provided by opposing rib formations projecting inwardly of said bend intermediate the closed end and the mouth thereof.

6. The combination recited in claim 1, wherein a similar slideway joins the lower ends of the laterally disposed slideways for receiving the lower end of the gate.

7. A water gate, comprising laterally disposed and elongate slideways spaced apart in opposed relationship to define a flow passage therebetween and to receive a gate for controlling flow through said passage, each of said slideways beings formed of stiffly flexible and water resistant structural sheet material bent to general W configuration wherein the bends are free for flexure and the central re-entrant bend has a constricted portion removed outwardly from the closed end thereof and facing the similarly constricted portion of the central re-entrant bend of the opposed slideway for slidably receiving the gate therein and making a sealing engagement therewith; means anchoring the terminal portions of the wings of said W configuration in their mutually spaced relationship; gate-sealing means extending between the lower ends of said slideways; and a gate slidably mounted in and extending between the said re-entrant bends of the respective slideways, being sealingly engaged by the said constricted portions thereof.

8. A water gate as recited in claim 7, wherein the gate-seating means is a similar slideway joining the lower ends of the laterally disposed slideways.

AVERNO T. BLACK.

References Cited in the file of this patent

UNITED STATES PATENTS

| Number | Name | Date |
|---|---|---|
| 602,973 | Buttorff | Apr. 26, 1898 |
| 863,764 | Taylor | Aug. 20, 1907 |
| 1,018,662 | Harlan | Feb. 27, 1912 |
| 1,287,574 | Dayley | Dec. 10, 1918 |
| 1,352,929 | Tucker | Sept. 14, 1920 |
| 1,409,524 | Chase | Mar. 14, 1922 |
| 1,660,408 | Bayley | Feb. 28, 1928 |
| 2,064,567 | Riley | Dec. 15, 1936 |